(12) United States Patent
Radusch et al.

(10) Patent No.: US 8,611,188 B2
(45) Date of Patent: Dec. 17, 2013

(54) METHOD AND APPARATUS FOR LOCATING AT LEAST ONE OBJECT

(75) Inventors: Ilja Radusch, Berlin (DE); Jens Pontow, Berlin (DE)

(73) Assignee: Fraunhofer-Gesellschaft zur Förderung der angewandten Forschung e.V., München (DE)

( * ) Notice: Subject to any disclaimer, the term of this patent is extended or adjusted under 35 U.S.C. 154(b) by 508 days.

(21) Appl. No.: 12/989,913

(22) PCT Filed: Apr. 27, 2009

(86) PCT No.: PCT/EP2009/055081
§ 371 (c)(1),
(2), (4) Date: Jan. 10, 2011

(87) PCT Pub. No.: WO2009/133078
PCT Pub. Date: Nov. 5, 2009

(65) Prior Publication Data
US 2011/0182148 A1    Jul. 28, 2011

(30) Foreign Application Priority Data

Apr. 28, 2008  (DE) .......................... 10 2008 021 701

(51) Int. Cl.
*G01S 3/80* (2006.01)
(52) U.S. Cl.
USPC ........................................................ 367/127
(58) Field of Classification Search
USPC ................................... 367/127–190, 87–116
See application file for complete search history.

(56) References Cited

U.S. PATENT DOCUMENTS

| | | | |
|---|---|---|---|
| 5,600,727 A | 2/1997 | Sibbald et al. | |
| 6,792,118 B2 | 9/2004 | Watts | |
| 6,941,246 B2 | 9/2005 | Raykar et al. | |
| 7,362,656 B2 | 4/2008 | Holm | |
| 2004/0137929 A1* | 7/2004 | Jones et al. | 455/517 |
| 2005/0065740 A1 | 3/2005 | Raykar et al. | |
| 2006/0077759 A1 | 4/2006 | Holm | |
| 2006/0268795 A1* | 11/2006 | Tamaki | 370/338 |
| 2010/0240297 A1 | 9/2010 | Jones et al. | |

FOREIGN PATENT DOCUMENTS

| | | |
|---|---|---|
| CN | 1575613 A | 2/2005 |
| WO | 0134264 A1 | 5/2001 |
| WO | 03043374 A1 | 5/2003 |
| WO | 2004051303 A1 | 6/2004 |
| WO | 2007001660 A2 | 1/2007 |

* cited by examiner

Primary Examiner — Luke Ratcliffe
(74) Attorney, Agent, or Firm — The Webb Law Firm (57) ABSTRACT

The invention relates to a method and a device for locating at least one object, in which a) a microphone device of the at least one object at least one acoustic signal of at least one acoustic source is received, b) the temporal profile of the at least one acoustic signal is automatically searched by a data processing device by the means of pre-defined criteria for at least one pattern, whereby c) the at least one pattern is an onset of the at least one acoustic signal or comprises an onset of the at least one acoustic signal and d) the localization of the at least one object occurs in dependency of the reception of the pattern by the means of a time synchronization.

25 Claims, 8 Drawing Sheets

METHOD AND APPARATUS FOR LOCATING AT LEAST ONE OBJECT

CROSS-REFERENCE TO RELATED APPLICATION

This application is a National Phase Patent Application of International Patent Application Number PCT/EP2009/055081, filed on Apr. 27, 2009, which claims priority of German Patent Application Number 10 2008 021 701.8, filed on Apr. 28, 2008.

BACKGROUND OF THE INVENTION

The invention relates to a method and a device for locating at least one object.

In a lot of areas it is necessary to be able to localize objects, in particular mobile devices in open areas or also in closed rooms. Localization in this context has to be understood such that the spatial relations of the objects among each other and/or the spatial relation of the object relative to a reference system, as a fixed space, are determined.

It is clear that this also includes mixed forms of the localization in case of which for instance the position of a first mobile device is determined relatively to a fixed reference system and then the positions of further mobile devices are determined relative to the position of the first mobile device. It is also possible for instance only to determine the distance of the objects, for instance of two mobile devices, among each other.

In U.S. Pat. No. 6,941,246 B1 for instance a system is known in which mobile devices emit acoustic signals by itself in order to allow a localization of the mobile devices.

From U.S. Pat. No. 6,792,118 B1 a system is for instance known by which time differences can be determined between two microphones when receiving.

An identification system is known from US 2006/0077759 in which different transmitters and receivers are used.

It is however not possible when using the known methods and devices to locate complex arrangements of objects relatively to each other and/or relative to a fixed reference system without that the objects emit for instance signals.

SUMMARY OF THE INVENTION

The object of the present invention is to provide a method with which this flexible localization, in particular a self localization, is possible.

At least one acoustic signal of at least one acoustic source is received by a microphone device of the at least one object. The time course of the at least one acoustic signal is automatically searched by a data processing device by the means of pre-defined criteria for at least one pattern and in dependency on receiving the pattern the localization of the at least one object occurs by the means of a time synchronization.

The at least one pattern is thereby an onset of the at least one acoustic signal or the at least one pattern comprises an onset of the at least one acoustic signal.

The data processing device can be a distributed system which is arranged completely outside of the object, it can be partially arranged in the objects, it can be partially separated or it can be completely arranged in the objects so that the objects exchange data among each other.

Therefore, it is possible to locate the at least one object solely on the basis of receiving an acoustic signal with a pattern.

Also, if the method is applicable to a stationary object, it is of an advantage, if the at least one object is designed as a mobile device. Therewith also moving or movable objects or devices can be located.

It is also an advantage, if the localization of the at least one object occurs relative to the at least one acoustic signal, relative to a fixed coordination system or relative to at least one further object.

It is an advantage if the at least one pattern is an onset of the at least one acoustic signal, namely a sudden change of sound volume and/or a change of wave pressure after a preceding phase of relative quietness and/or a signal generated due to the Doppler-effect. These patterns have in common that they can be extracted from a more complex acoustic signal.

It is furthermore of an advantage, if the search for the at least one pattern occurs on the basis of the property of the at least one acoustic signal, which is independent on the propagation path of the acoustic signal. Examples for these properties are for instance zero crossings of a timely changeable signal. In general the frequency and the wave forms of an acoustic signal are relative independent on the propagation path. When searching for a pattern it shall be identified that a signal pattern most likely useable for the localization of the object is present. In order to determine time differences these signal patterns have to be grouped according to their origin. The zero crossings and/or other properties are used for grouping the found onsets. If it is known that two found onsets were caused with probability by the same acoustic signal, then the distance can be estimated downwards by the means of running time differences. A statement is generated in the form: The distance between the two microphones is at least as large as the propagation velocity divided by the running time difference.

In a further exemplary embodiment a statistical analysis of the at least one acoustic signal received by the at least one object is carried out by the means of the data processing device for the determination of the most probable position of the object and/or the most probable position of at least two objects. Thereby, the determination of the position determination can be also carried out in case of noisy signals. A preferred possibility of the statistical analysis comprises an evaluation of a classification of distant measurements.

In a further exemplary embodiment of the invention the at least one pattern is recognized and/or characterized by a frequency analysis, by the means of a dominating frequency, by the means of the amplitude of the at least one acoustic signal (2), due to the number of zero crossings, a run length encoding and/or the wave form of the at least one acoustic signal (2). These parameters are very well suited for determining or characterizing a pattern within an acoustic signal.

Based on the time data of the arrival of the at least one pattern and the different running times resulting therefrom in case of at least two objects a distance between the at least two objects is automatically determined with an advantage. This method is basically simultaneously applicable to more than two objects.

In a further exemplary embodiment by the means of a data processing device the relative spatial position of multiple objects among each other and/or the absolute spatial position of multiple objects in a reference system are automatically determined. Therefore, the location between two objects, but also the location in a reference system can be carried out. Also a combination of these methods is possible so that a large flexibility is provided.

It is further of an advantage, if the at least one source of the at least one acoustic signal and/or the at least one object are coupled via a time synchronization, in particular via a radio signal.

Since the propagation of acoustic signals depends on the temperature of the surrounding medium, it is of an advantage, if the data processing device determines the temperature dependency on the at least one acoustic signal. This can occur for instance by a measurement of the air temperature, when the objects are for instance in contact with the air.

In an exemplary embodiment of the method according to the invention at least one object is designed as a mobile telephone or a portable computer. It is also for instance possible to locate objects of different kinds relative to each other and/or relative to a reference system.

BRIEF DESCRIPTION OF THE DRAWINGS

The invention is in the following explained in more detail relating to the Figures of the drawings by the means of multiple examples.

In the following different embodiments are illustrated, in which a localization occurs between mobile apparatus 10, 11. Basically, the invention can also be used for locating stationary objects 10, 11 so that the illustration of the following examples has not to be understood in a limiting manner. A self localization of the objects or also the mobile apparatus can hereby in particular occur by a localization.

Figure 1:
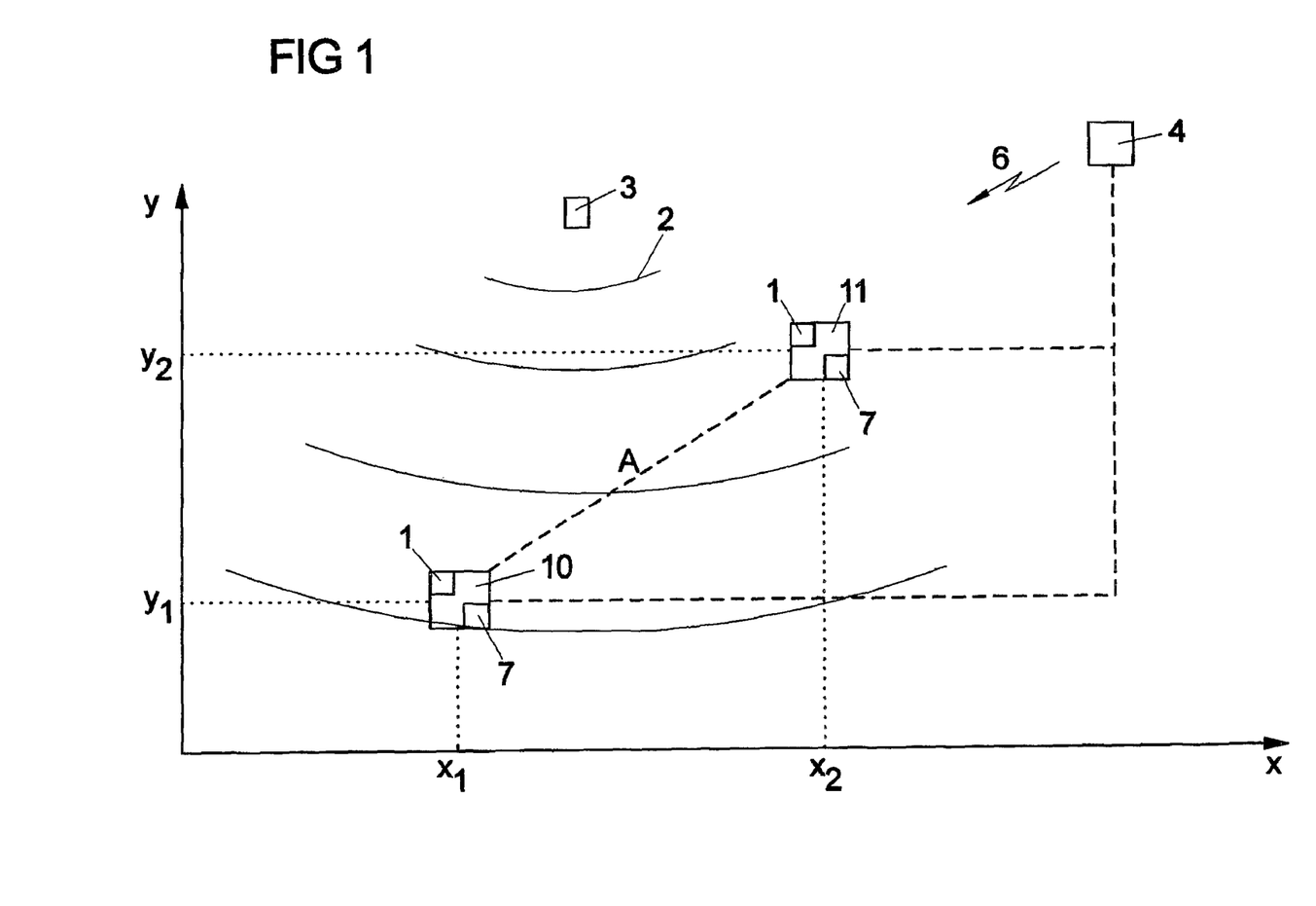
FIG. 1 shows a schematic illustration of the localisation of two mobile devices.

In FIG. 1 two mobile apparatus 10, 11 are shown in schematic manner which are formed in the present example as mobile telephones. In general, the mobile apparatus 10, 11 are autonomous systems, which can be for instance carried by a user or which can move autonomous, as for instance a robot in a workshop. The room in which the two mobile apparatus 10, 11 are to be found, has been reduced to two dimensions due to simplicity, so that the location of each mobile apparatus 10, 11 can be described by the coordinates $(x_i, y_i)$. The distance of the mobile apparatus 10, 11 is designated in the present case as A.

In general, the mobile apparatus 10, 11 can also move in a three dimensional space, so that the location of the apparatus is described by the coordinates $(x_i, y_i, z_i)$.

The mobile apparatus 10, 11 comprise microphone devices 1, with which acoustic signals 2 can be received from the surroundings. In FIG. 1 an acoustic source 3 is shown, which emits such an acoustic signal 2. As an acoustic signal a signal in a pressure fluctuation has to be understood, in which a sound wave expands. The medium is air in the following examples, whereby in general also a localization of objects in a liquid media (e.g. water) is possible. By knowing the velocity of propagation also a localization over interphases can occur. As an acoustic signal thereby not only a signal in the audible frequency range (ca. 16 to 20 000 Hertz) is to be understood, but the acoustic signal can also have parts in the infra and/or ultra sound range.

This source 3 does not have to be that kind such that it has to be designed for emitting an acoustic signal. It could be for instance sufficient, when two mobile apparatus 10, 11 register at different times a noisy, relatively short lasting noise or a sudden change if an acoustic signal 2. If two mobile apparatus 10, 11 are arranged in one room, it can be for instance sufficient to register the foot fall sound of walking persons. Herewith it becomes apparent that the at least one source 3 does not have to be stationary.

The shape of the pattern 5 in these acoustic signals 2 is registered by the two mobile apparatus 10, 11 essentially identical (may be variable noisy or at different times).

Only one acoustic source 3 is shown in FIG. 1 due to clarity reasons, whereby the localisation of the mobile apparatus 10, 11 described in the following also works with multiple acoustic sources.

As it will become apparent later, the acoustic source 3 does not have to be stationary, but it can also move in the room.

Figure 2:
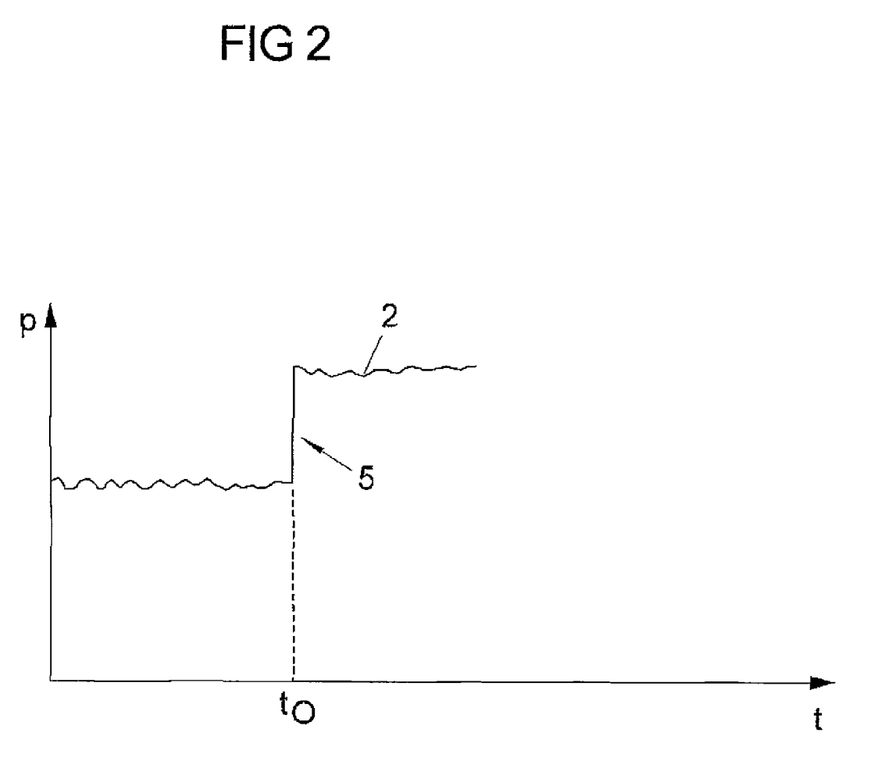
FIG. 2 shows a schematic illustration of a pattern in an acoustic signal.

The microphone devices 1 of the mobile apparatus 10, 11 receive the acoustic signal 2. Since the mobile apparatus 10, 11 are located in different distances to the acoustic source, they register a certain acoustic signal due to different running times at different times. In FIG. 2, the sound pressure p of an acoustic signal 2 is schematically plotted over the time t. The sound pressure is relatively low till a time point $t_0$. After the time point $t_0$ the sound pressure p is much higher. A person would recognize this change as a sudden change from "quiet" to "loud". Therewith, the acoustic signal 2 obtains a pattern 5, namely the change of sound pressure p designated as onset. Thereby, thresholds for the acoustic signal 2 can be defined, whereby the exceeding or falling below of said thresholds can provide that a counter for the onset is initiated.

Figure 2A:
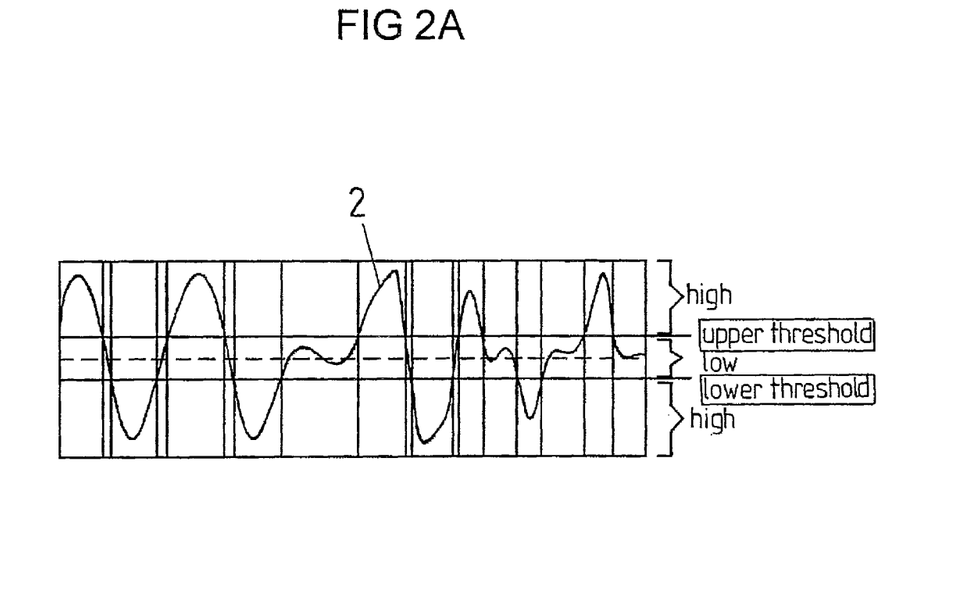
FIG. 2A shows a schematic illustration of a classifier for an acoustic signal.

Herewith, the exceeding or falling below of the thresholds can be registered by counting of trigger signals so that a pattern 5 can be characterized. In FIG. 2A such a classification for acoustic signals by the means of thresholds is shown. In FIG. 2A a pressure sound curve is shown as an acoustic signal 2, which runs through an upper and a lower threshold in irregular distances. In the area marked with grey the sound pressure is present between the thresholds. Herewith, a simple digitalization of the acoustic signal 2 is possible. The area between the thresholds can be interpreted as "relative quietness". The area outside of the thresholds can be interpreted as "relatively loud".

The microphone devices 1 register the change of the sound pressure p at different times.

In general, a sound, a noise, a sound pattern and/or a noise pattern stemming from the surrounding of the objects, that means an ambient noise and/or an ambient sound, can be used as onset. If the pattern 5 evaluates noises or sounds from the surrounding no innate energy for producing a locating signal is required, what provides a saving of energy.

It is in general also possible to use other parameters for recognition and/or characterization of the pattern 5. For this reason dominant frequencies could be determined by the means of the Fourier analysis. Also properties of the amplitudes or the number of zero crossings could be detected (see also FIG. 5). A further parameter, which can be used for identification of pattern 5, is the run length encoding.

The run length encoding is provided to describe the beginning section of a sound onset (or also of another sound event or pattern). This description (or also characterization) should occur independently on the amplitude of the sound signal, in order to compensate the different run lengths to the single microphones of the device and therefore the different volumes of the arriving signal.

In FIG. 1 an external part of a data processing device 4 is shown, which provides a time synchronization 6 for the mobile apparatus 10, 11. An internal part of the data processing device 7 in the mobile apparatus 10, 11 searches automatically through incoming acoustic signals for patterns 5, which can provide information of the relative position of the mobile apparatus 10, 11 to the acoustic source 3. Which functionalities of the data processing device 4, 7 are being formed externally to the mobile apparatus 10, 11 or internally in the mobile apparatus 10, 11 depends on the intended use. In general, it is possible and also of an advantage, if the complete data processing device is arranged in one or multiple objects, in particular in the mobile apparatus 10, 11, which can exchange data among each other.

Due to the time synchronization 6, for instance by radio waves, the distance of the mobile apparatus 10, 11 from the acoustic source 3 can be calculated. For the calculation, the emission time (beginning time) and/or the arrival time of the signal 2 can be used. If the location of the acoustic source 3 is known, a more specific localization of the mobile apparatus 10, 11 can occur.

In the above example the pattern 5 is included in a sound pressure curve. In general, the pattern 5 can be formed also from other parameters of an acoustic signal, as for instance the frequency, the amplitude or the wave form. The pattern 5 can also be based on a frequency change, which is provided due to the movement (Doppler-effect). Also combinations of these features are possible for forming a pattern 5. The pattern 5 provides therefore a signal that is embedded in the acoustic signal 2, but can be differentiated by the means of specific defined criteria from other parts of the acoustic signal 2. These types of patterns are also independent on the propagation path of the acoustic signal 2. In general, the frequency and the wave form of acoustic signals do not change or only very little in dependency on the propagation path.

A possibility is to determine dominating frequency by the means of a Fourier analysis, in particular a FFT.

Figure 4:
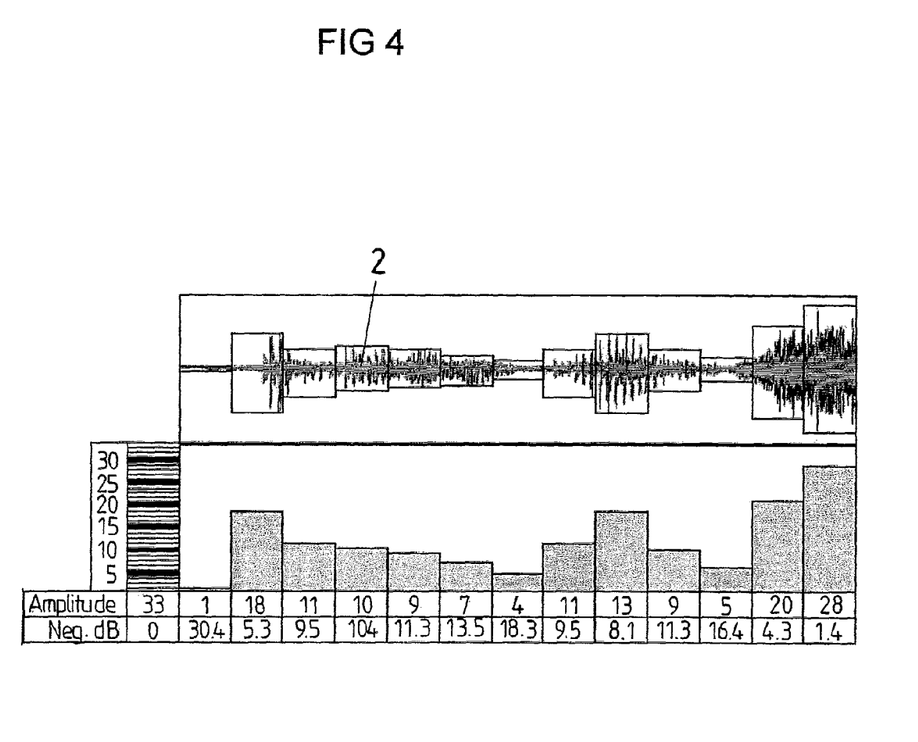
FIG. 4 shows a schematic illustration of an amplitude approximation.

In FIG. 4 an example for detection of the amplitudes, that means a criteria of the wave forms, is shown. In the upper part of FIG. 4 an acoustic signal 2 is shown, upon which windows of the same width are continuously applied. The height of the window equals the maximal plus the minimal amplitude of the acoustic signal in the windows. By the means of this easy to calculate measurement the amplitude of the signal can be approximated in an easy manner. The heights are shown below the signal in form of a bar chart. In the table below said chart the values for the amplitude approximation and the measured amplitudes are shown in negative decibels in respect to the maximal possible amplitude.

Figure 5:
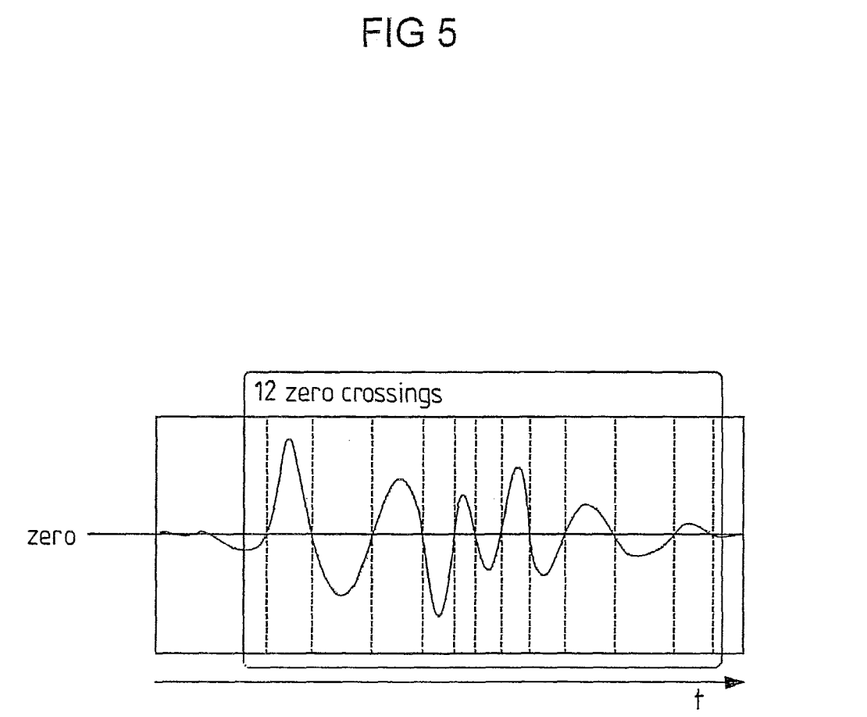
FIG. 5 shows a schematic illustration of zero crossings.

In FIG. 5 it is shown how the acoustic signal 2 can be characterized by the evaluation of zero crossings. In FIG. 5, 12 zero crossings are shown which are illustrated by the vertical dashed lines. Zero crossings are suitable for characterizing the acoustic signal, since the number of the crossings is independent on the distance.

Figure 6:
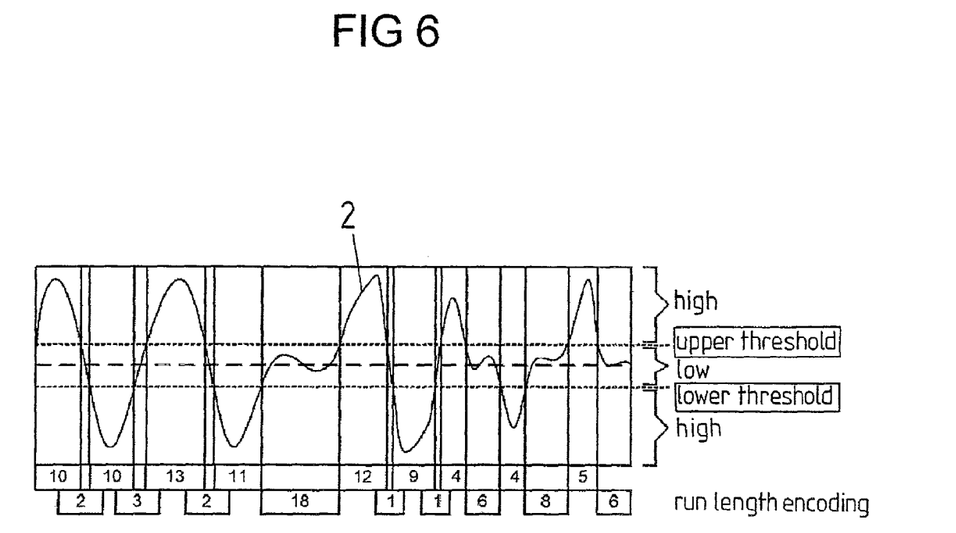
FIG. 6 shows a schematic illustration of a run-length encoding.

In FIG. 6 a run time encoding of the signal 2 is shown which has already been shown in FIG. 2A. The signal 2 is discretized by the run time encoding in order to be able to send it in a memo efficient manner. The numbers below the graph show in which time ranges the signal is present outside of the thresholds or within the thresholds. The signal 2 is being normalized in order to make it as far as possible independent on amplitude differences, which can stem for instance from different microphone characteristics. By normalizing a volume calibration of the possibly spatially distributed microphones can be omitted. These possibilities of characterizing acoustic signals can be used singularly or also in combination.

By the means of the determined time difference between two respective determined patterns 5 (onset of same origin) in the acoustic signal a minimal value for the distance estimation (path minimum) between the mobile apparatus, 10, 11 is determined, which estimates the distance A between the two microphone devices downwards. These values are designed in the following as minimal distance estimation and are calculated by the following formula:

$$\text{Path}_{Min} = \text{speed of sound} * |(\text{TOA1} - \text{TOA2})|$$

with $\text{path}_{min}$: minimal value of a distance between the mobile apparatus 10, 11 speed of sound: propagation velocity of acoustic signals 2 in air

TOA1: arrival time of the acoustic signal 2 at the first mobile apparatus 10

TOA2: arrival time of the acoustic signal 2 at the second mobile apparatus 11.

Therefore, the distance between the two mobile apparatus 10, 11 is at least as large as the minimal distance estimation. In case of stationary objects 10, 11 it could be pursued in an analogue manner.

The thus determined minimal distance estimations are stored for later processing by the data processing device 4, 7.

In the following it is described how these information of the pattern 5 can be further used for locating the mobile apparatus 10, 11.

A point thereby is that the two registered patterns 5 have to be compared with each other in order to determine that identical patterns 5 were received by different apparatus 10, 11.

If for instance the patterns 5 to be compared comprise four dominant frequencies, the energies of the four frequencies are normalized in order to make the patterns 5 comparable. Then an assignment of the singular frequencies of patterns 5 occurs. Subsequently, a measurement for the normalized energy differences can be calculated. If a threshold for differences still be acceptable has been defined it can automatically be determined if the patterns 5 match or do not match within the meaning of the definition.

In a similar manner, that means by normalizing and comparing the amplitudes the amplitudes' approximations shown in conjunction with FIG. 4 can be processed in order to enable a comparison between the received patterns 5. In general, also a run length encoding can be used.

For the comparison of the arrival times of the acoustic signals 2 the times of single pattern recognitions of different microphone devices 1 or mobile apparatus 10, 11 have to be comparable. In order to guarantee this timely comparability a unified network time for the mobile apparatus 10, 11 is established by the means of a suitable time synchronization 6.

Basically, it is also possible to provide a timely comparability of the measured results afterwards. This is for instance possible in case of a post facto time synchronization.

This timely synchronization 6 of the single mobile apparatus 10, 11 can be for instance also be provided by the means of radio signals, which serve as a timely reference. However, any other kind of timely synchronization 6 can be used for this purpose, which comprises a sufficient timely position.

The described calculation of the minimal distance estimation between the singular mobile apparatus 10, 11 is possible due to the knowledge of the speed of sound and the comparability of the sample times of singular participating mobile apparatus 10, 11 (or also stationary objects 10, 11). For this purpose, a respective constant speed of sound (C air) is assumed, which can be sufficiently estimated by the knowledge of the air temperature. For the estimation of the speed of sound in air (in the range between −20° C. and 40° C.) the following formula can be applied:

$$C_{air}=331.3+(0.6*temperature_{air})\ [m*s^{-1}]$$

$C_{air}$: speed of sound in air measured in $[m*s^{-1}]$
Temperature$_{air}$: air temperature in degree Celsius.

If at least one of the mobile apparatus 10, 11 comprises a thermometer device, then the temperature required for this calculation of the speed of sound can be determined.

Otherwise, the herefore required temperature can also be defined by the means of empirical values. In the time course a multitude of minimal distance estimation are obtained, which are stored. For a respective pair of the mobile apparatus 10, 11 (or also stationary objects 10, 11) to be localized all of these minimal distance estimations can be used in order to determine the distance between the two mobile devices 10, 11. Hereby, it is assumed that the position of a mobile apparatus 10, 11 is approximately equal to the distance of the microphone device 1 of the respective mobile apparatus 10, 11. The complete estimation of the distance between the respective two mobile apparatus 10, 11 is being designated in the following as complete distance estimation.

The possibility for a complete distance estimation results from a statistical evaluation of the measured patterns 5, for instance by an evaluation of a histogram of all minimal distance estimation to the respective two objects 10, 11. The maximal distance class of histograms is determined, which still has a significant relevancy. This distance class is subsequently called characteristic distance class.

Figure 3:
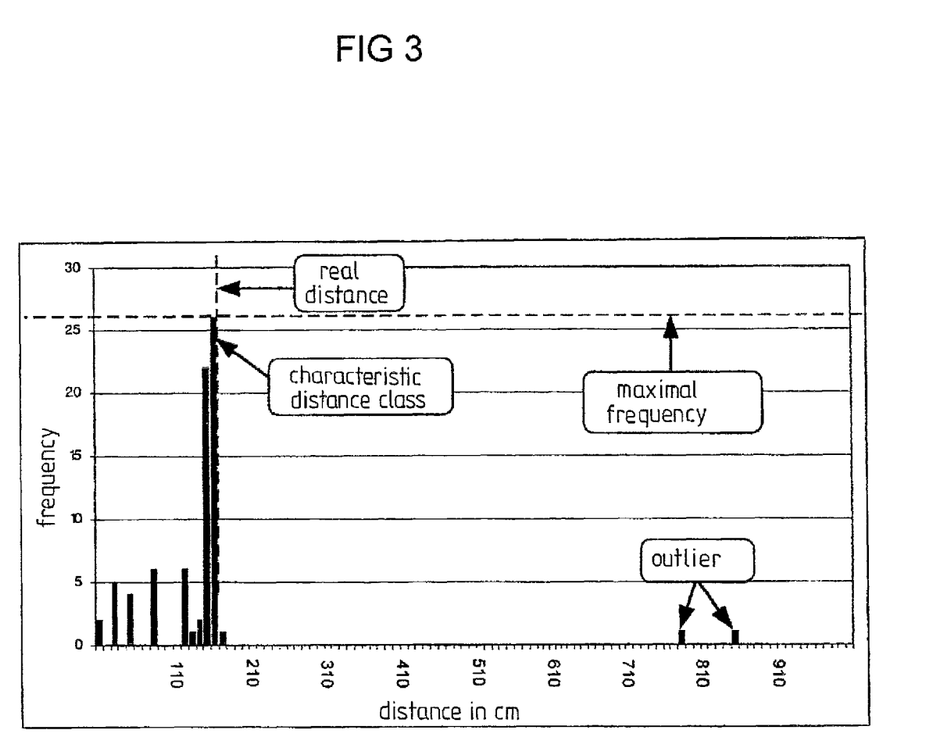
FIG. 3 shows a histogram for determining the characteristic distant classes.

FIG. 3 shows such a histogram with a fixed class width of respective width of 10 cm, respectively.

The actual distance between the two mobile apparatus 10, 11 is 1.6 m in this example. The maximal frequency is 26 and is caused by the class which aggregates the minimal distance estimation between 1.5 m and 1.6 m. This distance class is in this case simultaneously the characteristic distance class. In FIG. 3 all distance classes, which aggregate minimal distance estimations of larger distance, have a much lower frequency as the maximal frequency. Therefore, these distance classes obtain a lower relevancy and are not being seen as characteristic distance classes. The outlier on the right edge of the histogram are the results of imprecise measurements or other inadequacies, as for instance mistakes at the characterization or mistakes at the comparison of onsets.

With such a statistic analysis a secure localization can be carried out also in a noisy environment.

The width of the classes of this histogram in meters are defined according to the tasks. The relevancy of a class of such obtained histogram depends on the frequency of the minimal distance estimations.

When determining the complete estimation of the distance between the respective two mobile apparatus 10, 11 the classes with higher distance estimation are preferred over the ones with lower distance estimation by obtaining a higher relevancy. Therefore, an algorithm can determine the characteristic distance class of each histogram.

In order to find the characteristic distance class of the histogram a distance class is looked for which aggregates the largest minimal distance estimation between the two mobile apparatus 10, 11 to be localized and comprises simultaneously at least a fraction of the maximal frequency of the histogram of all minimal distance estimation to the respective two objects 10, 11 defined beforehand. As an example of such a fraction we defined the frequency of a quarter of the maximal frequency. The relevancy of a distance class can be therefore defined by the upper limit of a distance class in meter in dependency, whether the respective distance class still comprises a relevant frequency. If a distance class has a lower frequency as the required fraction of the maximal frequency said distance class has the lowest relevancy of 0.

In addition to the complete distance estimation its quality can be determined. This quality estimates how resilient or meaningful such an obtained complete distance estimation is for the following process of the reconstruction of the topology (that means the localization of the mobile apparatus 10, 11). The quality of the complete distance estimation between two or more mobile apparatus 10, 11 depend on the form of the amount of the minimal distance estimations. In case of more than two objects 10, 11 a suitable norm for the distances between the objects 10, 11 as for instance a minimum of the singular qualities is used.

A limit is defined which determines when a complete distance estimation has a sufficient quality. The quality of a complete distance estimation is subsequently designated as estimation quality. In order to determine the estimation quality different heuristics are provided.

It is possible to define the estimation quality depending on the number of minimal distance estimations. Therefore, a limit is required which indicates how many minimal distance estimations are necessary for a complete estimation quality. The following formula indicates how the estimation quality can be calculated.

If number (minimal distance estimation)<limit:

$$\rightarrow G_{limit}=number(minimal\ distance\ estimations)/limit$$

If number (minimal distance estimation)≥limit:

$$\rightarrow G_{limit}=1$$

with
$G_{limit}$: quality of the complete distance estimation determined by the means of a limit in respect to the number of the minimal distance estimations
number (minimal distance estimation): number of the minimal distance estimations
limit: limit to be defined.

The quality of the complete distance estimation can also be defined by the shape of a histogram, which is created for this purpose from subset of the minimal distance estimations. The subset used therefore of the present minimal distance estimation is determined by all minimal distance estimations which belong to the characteristic distance class or are smaller in their distance estimation. A histogram with N classes is formed from these minimal distance estimations. The class width is thereby determined such that the minimal distance estimation with the highest value can barely be integrated into the last class. The obtained histogram is being compared with a reference histogram. The reference histogram is the one to be expected perfect histogram with N classes, which adapts an equal distribution of the sound sources. Thereby, the reference histogram to be expected is being scaled such that the highest class has the same frequency as the generated histogram. The sum of all deviations divided by the maximal possible deviation results in the quality of the complete distance estimation. The maximal deviation is the sum of all frequencies of the to be expected reference histogram scaled before.

The estimation quality can be used in multiple manners. For instance it can serve to ignore the complete distance estimations as long as these have an insufficient quality.

Another possibility is to consult the quality as relevant for the reconstruction of topology (that means for the localization).

It is possible to simulate the localization of the mobile apparatus 10, 11 by a model in which the apparatus 10, 11 are assumed as masses which are connected by springs. The estimation quality can be used by such a "mass-spring" simulation for defining the firmness of the single springs proportional to this quality of the causing complete distance distance estimation. Then, complete distance estimations of lower quality would have lower influence onto the result of the reconstruction of the topology as the ones with higher quality.

By the means of a suitable method subsequently the relative picture of location of the microphone devices 1 to each other can be determined. Suitable methods for calculating the relative location of the microphone devices 1 or the mobile apparatus 10, 11 due to the complete distance estimations are for instance mass-spring-simulations or the "multidimensional scaling". In case of the mass-spring-simulation the singular mobile apparatus 10, 11 are represented as point masses. Each complete distance estimation being present results in a spring between the two point masses with the length of a complete distance estimation which represents these mobile apparatus 10, 11. The energy of the singular springs is minimized iteratively until a stable balance is reached. This last stable configuration is in turn interpreted as a relative picture of the location of the mobile apparatus 10, 11.

If it is assumed that the mobile apparatus 10, 11 are in one plane, then the space for the previously described reconstruction of the topology (that means the localization of the mobile apparatus 10, 11) should be also two-dimensional. If this is not the case, then the reconstruction of the topology has to work with three-dimensional coordinates.

Figure 7:
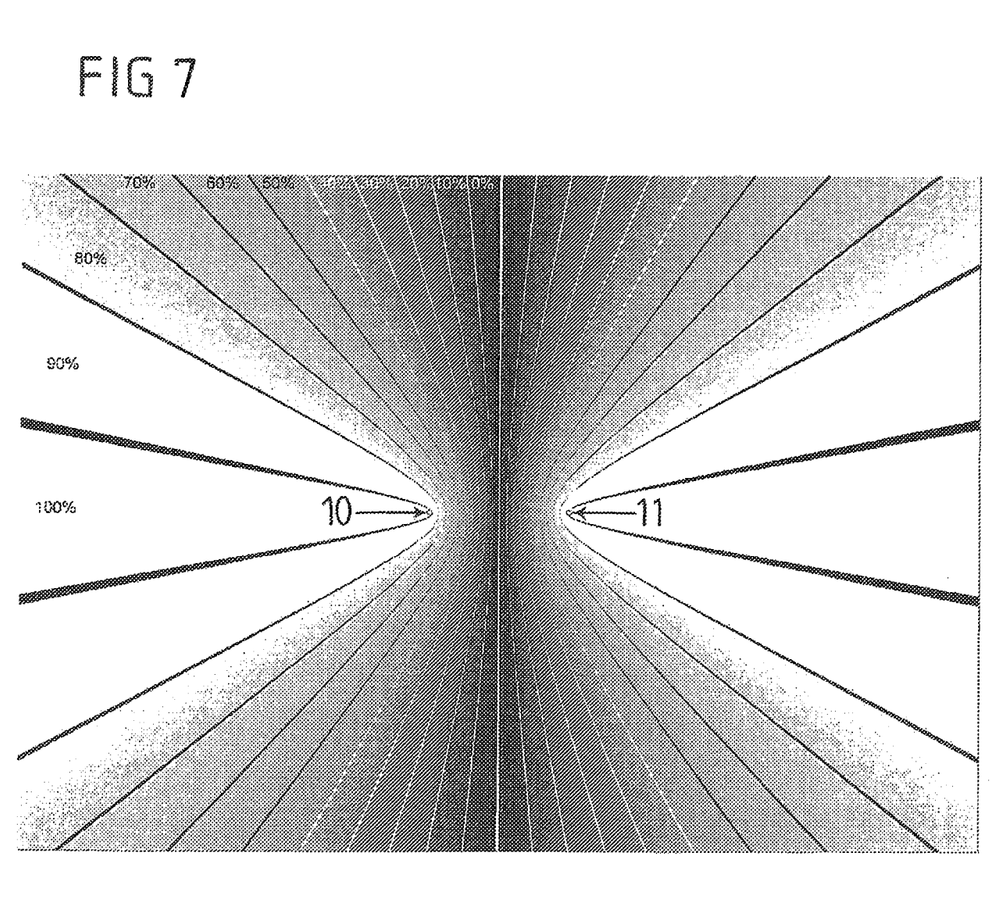
FIG. 7 shows a schematic illustration of the quality of the estimation of the distance between two objects.

In FIG. 7 it is shown how the geometrical arrangement of the acoustic source 3 relatively to the two objects 10, 11 effects the estimation of the distance A (see FIG. 1 for the geometrical arrangement). Basically, each measurement of the acoustic signals has a mistake, which is dependent on the relative arrangement of the source 3 and the objects 10, 11.

In FIG. 7 the two objects 10, 11 are arranged stationary and are shown approximately in the centre in FIG. 7. Depending on the geometrical arrangement of the acoustic source 3 different mistakes occur. In FIG. 7 the quality of the measurement is shown in form of isolines. If the acoustic source 3 and the two objects 10, 11 are located on a straight line and the source 3 is not exactly located between the two objects 10, 11 the mistake is the lowest, that means the quality of the measurement is approximately 100%. In the other extreme the acoustic source 3 is located on the perpendicular by-sectors of the sides between the objects 10, 20 so that the quality of the measurements is here almost zero. The middle values shown in FIG. 7 are between these extremes.

The invention is not restricted to the previously shown preferred embodiments. In fact, a number of variants are thinkable, which use the method and the device according to the invention also in case of basically different types of embodiments.

List of Reference Signs

| | |
|---|---|
| 1 | Microphone device |
| 2 | Acoustic signal |
| 3 | Acoustic source |
| 4 | Data processing device (external part) |
| 5 | Pattern in the acoustic signal |

List of Reference Signs -continued

| | |
|---|---|
| 6 | Time synchronization |
| 7 | Data processing device (internal part) |
| 10 | First mobile apparatus, first object |
| 11 | Second mobile apparatus, second object |
| A | Distance between two mobile apparatus (object) |

The invention claimed is:

1. A method for locating at least one object, the method comprising:
   receiving, by a microphone device of the at least one object, at least one acoustic signal from at least one acoustic source;
   automatically searching, by a data processing device, a temporal profile of the at least one acoustic signal based on pre-defined criteria to determine at least one pattern of the at least one acoustic signal, wherein the at least one pattern comprises an onset of the at least one acoustic signal, and the onset comprises a sound, a noise, a sound pattern and/or a noise pattern stemming from a surrounding environment of the at least one object; and
   determining, by the data processing device, a location of the at least one object based on a comparison of the at least one pattern to at least one further pattern determined at at least one further object receiving the at least one acoustic signal, wherein the at least one object and the at least one further object have a time synchronization which is independent of the acoustic signal.

2. The method according to claim 1, wherein the at least one object comprises a mobile apparatus.

3. The method according to claim 1, wherein the location of the at least one object is determined relative to the at least one acoustic source, relative to a fixed coordination system or relative to the at least one further object.

4. The method according to claim 1, wherein the onset of the at least one acoustic signal comprises a sudden change of the sound level and/or a change of sound pressure after a preceding phase of relative quietness and/or a signal generated due to the Doppler-effect.

5. The method according to claim 1, wherein the automatic search to determine the at least one pattern is based on a property of the at least one acoustic signal which is independent of a propagation path of the acoustic signal.

6. The method according to claim 1, further comprising:
   performing, by the data processing device, a statistical analysis of the at least one acoustic signal received by the at least one object; and
   determining, based on the statistical analysis, a most probable position of the at least one object and/or a most probable position of at least two objects including the at least one object and the at least one further object.

7. The method according to claim 6, wherein the statistical analysis comprises an evaluation of a classification of distance measurements.

8. The method according to claim 1, wherein the at least one pattern is recognized and/or characterized by frequency change, a dominating frequency, an amplitude of the at least one acoustic signal, a number of zero crossings, a run length encoding and/or a wave form of the at least one acoustic signal.

9. The method according to claim 1, further comprising:
   automatically determining, based on time data of an arrival of the at least one pattern at the at least one object, time data of an arrival of the at least one further pattern at the at least one further object and different running times resulting therefrom, a distance (A) between the at least one object and the at least one further object.

10. The method according to claim 1, further comprising: automatically determining, by the data processing device, a relative spatial position of multiple objects amongst each other and/or an absolute spatial position of multiple objects in a reference system.

11. The method according to claim 1, wherein the at least one source of the at least one acoustic signal and the at least one object are coupled via the time synchronization.

12. The method according to claim 1, further comprising: determining, by the data processing device, a temperature dependency of the at least one acoustic signal.

13. The method according to claim 1, wherein the at least one object comprises a mobile telephone or a portable computer.

14. A device for locating at least one object, wherein the at least one object comprises a microphone device, configured to receive at least one acoustic signal of at least one acoustic source the device comprising:
- a data processing device configured to automatically search a temporal profile of the at least one acoustic signal based on predefined criteria to determine at least one pattern;
- a detecting unit configured to detect the at least one pattern of the at least one acoustic signal with at least one onset, wherein the onset is a sound, a noise, a sound pattern and/or a noise pattern stemming from the surrounding of the at least one object; and
- a locating unit configured to locate the at least one object based on a comparison of the at least one pattern to at least one further pattern detected at at least one further object receiving the at least one acoustic signal, wherein the at least one object and the at least one further object have a time synchronization which is independent of the acoustic signal.

15. The device according to claim 14, wherein the detecting unit is configured to detect the at least one pattern based on a sudden change of the sound level and/or a change of sound pressure after a preceding phase of relative quietness and/or a signal generated due to the Doppler-effect.

16. The device according to claim 14, comprising a search unit configured to search for the at least one pattern based on a property of the at least one acoustic signal, whereby the property is independent on the propagation path of the acoustic signal.

17. The device according to claim 14, further comprising a statistical analysis unit configured to perform a statistical analysis of the at least one acoustic signal received by the at least one object to determine a most probable position of the at least one object.

18. The device according to claim 17, wherein the statistical analysis comprises an evaluation of a classification of distance measurements.

19. The device according to claim 17, further comprising a frequency analysis unit configured to perform a frequency analysis of the at least one pattern based on a dominating frequency, an amplitude of the at least one acoustic signal and/or a wave form of the at least one acoustic signal.

20. The device according to claim 14, wherein the data processing device is configured to automatically determine, based on time data of an arrival of the at least one pattern at the at least one object, time data of an arrival of the at least one further pattern at the at least one further object and different running times resulting therefrom, a distance (A) between the at least one object and the at least one further object.

21. The device according to claim 14, wherein the data processing device is configured to automatically determine, a relative spatial position of multiple objects among each other and/or an absolute spatial position of multiple objects in a reference system.

22. The device according to claim 14, wherein the at least one source of the at least one acoustic signal and the at least one object are coupled via the time synchronization.

23. The device according to claim 14, wherein the data processing device is configured to determine a temperature dependency of the at least one acoustic signal.

24. The device according to claim 14, further comprising an emitting unit configured to emit a signal for localization.

25. A mobile device for use according to the method according to claim 1, wherein the mobile device is a mobile telephone.

* * * * *

UNITED STATES PATENT AND TRADEMARK OFFICE
CERTIFICATE OF CORRECTION

PATENT NO. : 8,611,188 B2  
APPLICATION NO. : 12/989913  
DATED : December 17, 2013  
INVENTOR(S) : Ilja Radusch et al.

Page 1 of 1

It is certified that error appears in the above-identified patent and that said Letters Patent is hereby corrected as shown below:

In the Claims

Column 11, Line 19, Claim 14, after "device" delete ","

Column 12, Line 13, Claim 19, "claim 17" should read -- claim 14 --

Signed and Sealed this
Fifteenth Day of April, 2014

Michelle K. Lee
*Deputy Director of the United States Patent and Trademark Office*

UNITED STATES PATENT AND TRADEMARK OFFICE
CERTIFICATE OF CORRECTION

PATENT NO. : 8,611,188 B2
APPLICATION NO. : 12/989913
DATED : December 17, 2013
INVENTOR(S) : Radusch et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 581 days.

Signed and Sealed this
Twenty-second Day of September, 2015

Michelle K. Lee
*Director of the United States Patent and Trademark Office*